United States Patent [19]
Ochiai

[11] Patent Number: 5,596,249
[45] Date of Patent: Jan. 21, 1997

[54] HORIZONTAL OUTPUT CIRCUIT

[75] Inventor: Masashi Ochiai, Saitama-ken, Japan

[73] Assignee: Kabushiki Kaisha Toshiba, Kawasaki, Japan

[21] Appl. No.: 508,700

[22] Filed: Jul. 28, 1995

[30] Foreign Application Priority Data

Aug. 1, 1994 [JP] Japan ................................. 6-180195

[51] Int. Cl.$^6$ ............................. H01Q 3/22; H01Q 3/24; H01Q 3/26
[52] U.S. Cl. .......................................... 315/371; 315/408
[58] Field of Search ...................................... 315/371, 408

[56] References Cited

U.S. PATENT DOCUMENTS

| | | |
|---|---|---|
| 3,906,305 | 9/1975 | Nillesen . |
| 4,677,350 | 6/1987 | Wharton et al. ................... 315/371 |
| 4,906,903 | 3/1990 | Ochiai . |
| 4,935,675 | 6/1990 | Ochiai . |
| 5,043,637 | 8/1991 | Gries et al. ..................... 315/371 |
| 5,059,874 | 10/1991 | Oliver .......................... 315/411 |

FOREIGN PATENT DOCUMENTS 2207028  1/1989  United Kingdom .

OTHER PUBLICATIONS

IBM Technical Disclosure Bulletin, "Low Dissipation E–W Raster Correction", vol. 33, No. 1A, Jun. 1990, pp. 73–74.

Primary Examiner—Theodore M. Blum
Attorney, Agent, or Firm—Cushman Darby & Cushman IP Group of Pillsbury Madison & Sutro LLP

[57] ABSTRACT

A horizontal output circuit having a east and west pincushion distortion correcting function modulating the amplitude of a horizontal deflecting current to be parabolic in a vertical period by using a pulse width variable pulse signal. A voltage produced in a capacitor C1 provided between a series circuit of a horizontal deflecting coil Dy and S correcting capacitor Cs connected in parallel to a horizontal output transistor Q3 and a reference potential point GND is modulated by using a pulse signal from a pulse width modulating IC 10. The modulated voltage is fed to a smooth circuit including a coil L2 and capacitor C2 provided in parallel with the capacitor C1. A negative power source is obtained by this smooth circuit from which power is fed to a power source terminal 13 of the pulse width modulating IC 10. That is to say, a negative voltage –Vlave produced in the capacitor C2 is integrated, the voltage is stored in said capacitor C2 and the average voltage –Vlave is fed as a negative power source to the power source terminal 13 of the pulse modulating IC 10. The power source has little power loss and can be formed of a small number of component parts.

6 Claims, 7 Drawing Sheets $I_{DC}+I_{LP}$

AC=0
DC=0

WHEN L1 CIRCUIT IS OPENED i1

0

WHEN L1 CIRCUIT IS CLOSED AND T1 IS LARGE

CURRENT FLOWING THROUGH DIODE D3 : $I_{DC}+I_{LP}+i_1$

0

FIG.7(a) (RELATED ART) CAPACITOR C1 RESONANT VOLTAGE −V1

FIG.7(b) (RELATED ART) IC 10 OUTPUT VOLTAGE

FIG.7(c) (RELATED ART) IC 10 OUTPUT CURRENT (I1+I2)

T1: PERIOD WHEN Q1 IS ON AND Q2 IS OFF
T2: PERIOD WHEN Q1 IS OFF AND Q2 IS ON

HORIZONTAL OUTPUT CIRCUIT

BACKGROUND OF THE INVENTION

1. Field of the Invention

This invention relates to a television receiver horizontal output circuit having an east and west pincushion distortion correcting function.

2. Description of the Related Art

A conventional horizontal output circuit having a pulse width modulating east and west pincushion distortion correcting function is shown in FIG. 6. A horizontal output transistor Q3, damper diode Dd and resonant capacitor C01 are connected in parallel with a series circuit of a horizontal deflecting coil Dy and S correcting capacitor Cs. Between the emitter of the horizontal output transistor Q3 and a reference potential point GND are provided a capacitor C1 and diode D3 so that the cathode may be on the reference potential side. Further, between the collector of the horizontal output transistor Q3 and the reference potential point GND are connected in parallel a diode D4 and second resonant capacitor C02. Also, the collector of the horizontal output transistor Q3 is connected to a DC power source EB through a primary winding of a fly-back transformer FBT. A decoupling capacitor C3 is connected in parallel with the DC power source EB.

A pulse width modulating integrated circuit (which shall be mentioned as a pulse width modulating IC hereinafter) 10 is connected through a coil L1 to the capacitor C1 at one end. This pulse width modulating IC 10 is provided with power source terminals 12 and 13 and a signal output terminal 14. The signal output terminal 14 of this IC 10 and the above mentioned capacitor C1 at one end are connected with each other through the coil L1.

The final step of the pulse width modulating IC 10 is formed of a single end type of a PNP transistor Q1 and NPN transistor Q2. The emitter of the PNP transistor Q1 is connected to a positive power source terminal 12 and the emitter of the NPN transistor Q2 is connected to a negative power source terminal 13. Between the collector and emitter of both the PNP transistor Q1 and the NPN transistor Q2 are provided diodes D1 or D2 respectively. The diode D1 is provided so that the cathode may be on the emitter side of the PNP transistor Q1 and the diode D2 is provided so that the cathode may be on the collector side of the NPN transistor Q2.

A pulse width modulating driving circuit 11 is connected to each transistor base. The NPN and PNP transistors Q1 and Q2 are controlled to be on and off by this pulse width modulating driving circuit 11. A positive power source terminal 12 is connected to the reference potential point. A negative power source terminal 13 is connected to the connecting point of a capacitor C4 and diode D5 of a rectifying circuit 20 provided on the tertiary winding side of the fly-back transformer FBT. Through this arrangement, rectifying circuit 20 comprises a diode D5 and capacitor C4. A constant negative voltage −Vcc obtained by rectifying the tertiary winding voltage is fed to the negative power source terminal 13.

The horizontal output circuit is formed as described above. A negative resonant voltage produced in the capacitor C1 during the fly-back time is varied to be parabolic in a vertical period (1V) by a pulse-like signal repeatedly fed from a modulating signal source 10. That is to say, by making the width of a pulse-like signal variable by the modulating signal source 10, the amplitude of the horizontal deflecting current is modulated to be parabolic in a vertical period and the east and west pincushion distortion is corrected.

Here, if the average value of the negative resonant voltage produced in the capacitor C1 is represented by Vlave, the voltage of the DC power source EB is represented by EB, the inductance of the horizontal deflecting coil Dy is represented by Ly and the scanning period is represented by Ts, in such circuit as in FIG. 6, the deflecting current Iy (p-p value) will be given by the following formula:

$$Iy(p-p) = \frac{E_B - (-V_{1ave})}{Ly} \cdot Ts = \frac{E_B + V_{1ave}}{Ly} \cdot Ts \quad \text{(Formula 1)}$$

, where p-p is an abbreviation of "PEAK TO PEAK" and represents a width from the minimum value to the maximum value of the amplitude of the deflecting current.

In the circuit in FIG. 6, the negative resonant voltage produced in the capacitor C1 by the pulse width modulating IC 10 connected to the coil L1 is varied to be parabolic by a vertical period (1V) and the east and west pincushion distortion is corrected. This operation shall be explained in the following.

FIGS. 7(a)–7(c) are diagrams for explaining the operation of the circuit shown in FIG. 6. FIGS. 7(a)–7(c) show the operation over a horizontal period (1H). Time is shown on the abscissa of the diagram. FIG. 7(a) represents a resonant voltage of the capacitor C1, FIG. 7(b) represents an output voltage of the IC 10, and FIG. 7(c) represents an output current of the IC 10.

In the period of t0 to t2, a driving voltage is fed to the base of the transistor Q1 from the pulse width modulating driving circuit 11 in the front step. The PNP transistor Q1 becomes conductive. An output current I1 flows to the coil L1 from the signal output terminal 14 through the emitter-collector path of Q1 from the reference potential point GND. Between t0 and t1 (fly-back period) within this period, the current I1 is linearly increased by the negative resonant voltage (FIG. 7(a)) produced in the capacitor C1. In t1 to t2, both ends of the capacitor C1 are short-circuited by the diode D3 and are therefore of the reference potential. There is no voltage within the loop formed by the positive power source terminal of the reference potential point and the signal output terminal 14, and the current I1 is held constant from the time t1. At t2, the Q1 is turned off (at this time, a driving voltage is applied to the base of the Q2 from the driving circuit 11 in the front step and the Q2 turns on) and a current I2 flows to the coil L1 through the diode D2 from the negative power source terminal 13 in the direction holding the previous current by a counter electromotive force generated in the coil L1. At this time, the current I2 is decreased with time by the negative power source (−Vcc) on the basis of the linear current flowing in the reverse direction. Again, at the time t0, a driving voltage is applied to the base of the PNP transistor Q1 and the above mentioned operation is repeated. When the period from t0 to t1 and further to t2 is represented by T1 and the period from t2 to the next t0 is represented by T2, the magnitude of the resonant voltage (negative value −V1) produced in the capacitor C1 can be modulated by varying the ratio (T1/T2) as shown by the solid line and dotted line in FIG. 7(a).

The waveform of the dotted line in FIGS. 7(a)–7(c) represent the operation when the ratio of the time for the waveform of the solid line is varied, the T1 is made longer and the T2 is made shorter. When the T1 is made longer, the discharge current of the capacitor C1 flowing through the coil L1 will increase causing the resonant voltage produced in the capacitor C1 decrease as shown by the dotted line in FIG. 7(a).

When the ratio of T1/T2 in the vertical period is varied utilizing this principle, the east and west pincushion distortion can be corrected. That is to say, if T1/T2 is made larger at the beginning and end of the vertical period and smaller where it corresponds to the middle in a picture screen, the resonant voltage V1 is inversely affected, decreasing at the beginning and end of the vertical period and increasing where it corresponds to the middle in the picture screen. Therefore, as evident from the formula 1, the deflecting current Iy will become smaller at the beginning and end of the vertical period and will become larger where it corresponds to the middle in the picture screen. Thus, the east and west pincushion distortion will be able to be corrected. Diode D4 prevents the sum (ILP+IDC) of the primary winding current ILP flowing to the diode D3 and the direct current IDC flowing in from the DC power source EB from becoming negative at the beginning of the scanning period or from becoming discontinuous, and prevents the diode D3 from being off.

However, there are the following defects in the above mentioned circuit.

In FIG. 6, the output current I2 in the T2 period flows in the normal direction of the diode D2 from the power source terminal 13 of the pulse width modulating IC 10. When there is no shunt regulator 40, the output current I2 at this time will pass through the smooth capacitor C4 in the rectifying circuit 20 of the negative power source (−Vcc) from the reference potential point GND, will flow into the power source terminal 13 of the modulating IC 10, and will negatively charge the smooth capacitor C4. Therefore, the diode D5 will be off, the voltage at both ends of the smooth capacitor C4 will progressively reduce with the number of the operations until at last the circuit no longer inherently operates.

In order to prevent such problems, it is necessary to provide the shunt regulator 40 between the power source terminal 13 and rectifying circuit 20 as shown in FIG. 6. In order that the power source voltage may be constant, an electric current corresponding to the output current I2 must flow continuously. In such case, there have been problems of increasing the cost of the shunt regulator 40 and incurring an excessive power loss. For example, if the average value of the output current I2 is 250 mA and −Vcc is −27 V, an electric power of 6.8 W will be lost. Also, when the required correction amount is large, as the maximum correction range is from the reference potential to the negative power source voltage −Vcc, there has been a problem that the number of the tertiary windings of the fly-back transformer FBT will have to be increased and the negative power source voltage −Vcc will have to be increased if the variation width of the average value −Vlave of the resonance voltage of the capacitor C1 is intended to be made larger to increase the correction amount.

FIG. 8 shows another conventional example of a horizontal output circuit having a pincushion distortion correcting circuit. A first resonant capacitor C01 and damper diode Dd are connected in parallel with a series circuit of a horizontal deflecting coil Dy and S correcting capacitor Cs. A east and west pincushion distortion correcting circuit is provided between the series circuit of the horizontal deflecting coil Dy and S correcting capacitor Cs and the reference potential point GND. This east and west pincushion distortion correcting circuit is formed of a capacitor C1, diode D7 (corresponding to the diode D3 in FIG. 6) and series circuit consisting of a coil L2 and capacitor C2. The diode D7 is provided so that the anode may be on the reference potential side. The capacitor C1 is connected in parallel with this diode D7. A series circuit of the coil L2 and capacitor C2 is provided in parallel with this capacitor C1. Nothing corresponds to the diode D4 provided in FIG. 6. By providing the series circuit of the coil L2 and capacitor C2, a saw tooth wave current i1 is made to flow in the illustrated direction and the diode D7 is prevented from being off in the initial period of the scanning period.

A positive voltage is fed to the positive power source terminal 12 of a pulse width modulating IC 10 through a rectifying circuit 30 from the tertiary winding of a fly-back transformer FBT. The negative power source terminal 13 of this modulating IC 10 is connected to the reference potential point GND and the signal output terminal 14 is connected to the capacitor C1 through the coil L1.

The operation in FIG. 8 shall be explained in the following. It is fundamentally the same as in FIG. 6. The deflecting current is given by the formula 2:

$$I_y(p-p) = \frac{E_B - (+V_{1ave})}{L_y} \cdot T_s = \frac{E_B - V_{1ave}}{L_y} \cdot T_s \quad \text{(Formula 2)}$$

During the fly-back period, as different from the circuit in FIG. 6, a positive resonant voltage V1 is produced in the capacitor C1. In order to modulate it, a pulse having a predetermined duty ratio is repeatedly fed from the signal output terminal 14 of the modulating IC 10 to the capacitor C1. By varying this duty ratio, that is, the ratio of T1/T2 in the same manner as in FIG. 7, the resonance voltage V1 is varied to be parabolic in a vertical period (1V) and the east and west pincushion distortion is corrected.

However, even in this circuit, it is necessary to provide a shunt regulator 50 between the positive power source Vcc and reference potential point GND or another load corresponding to the shunt regulator 50 between the power source Vcc line and reference potential point GND to discharge the current I1 flowing into the power source Vcc line. Therefore, when there is no other load corresponding to the shunt regulator, the same as in FIG. 6, the cost of the shunt regulator will become high and an excessive power loss will be incurred.

As mentioned above, in the conventional technique, a positive or negative power source must be provided for the tertiary winding of the fly-back transformer, there is no discharging path in the capacitor of the tertiary winding side rectifying circuit, and a discharging load or regulator must be provided between the rectifying circuit and positive or negative power source terminal. Therefore there has been a problem that not only the number of component parts increases but also an excessive power loss is incurred in the regulator.

SUMMARY OF THE INVENTION

An object of the present invention is to provide a horizontal output circuit wherein a power source necessary to modulate a pulse width can be realized by a simple circuit formation having few component parts.

Another object of the present invention is to provide a horizontal output circuit wherein a dischargeable power source can be realized with a small power loss and at a low cost.

The horizontal output circuit according to the first invention is characterized by comprising:

a horizontal output transistor having a base, emitter and collector and fed on the base with a driving signal of a horizontal period;

a first parallel circuit formed by connecting a damper diode, first resonant capacitor and series circuit of a horizontal deflecting coil and S correcting capacitor in parallel between the collector and emitter of said transistor;

a second resonant capacitor connected between the collector of said transistor and a reference potential point.

a second parallel circuit formed by connecting a diode of a polarity reverse to that of said damper diode and a third capacitor in parallel between the emitter of said transistor and the reference potential point;

a smooth circuit comprising a first coil connected at one end to the emitter of said transistor and a fourth capacitor connected between the other end of this first coil and the reference potential point;

a modulating signal source having power source terminals and a signal output terminal and putting out of this signal output terminal a pulse signal varying in the vertical period;

a means of feeding said pulse signal from said modulating signal source to said third capacitor through a second coil; and a power source feeding means feeding the DC voltage produced in said fourth capacitor to the power source terminal of said modulating signal source.

In the first invention, a power source voltage for driving the modulating signal source can be obtained from the voltage produced in the fourth capacitor of the smooth circuit connected in parallel with the third capacitor.

The horizontal output circuit according to the second invention is characterized by comprising:

a horizontal output transistor having a base, emitter and collector and fed on the base with a driving signal of a horizontal period;

a first parallel circuit formed by connecting a first damper diode, first resonant capacitor and series circuit of a horizontal deflecting coil and S correcting capacitor in parallel between the collector of said transistor and a first point;

a second parallel circuit formed by connecting a second damper diode and second resonant capacitor in parallel between said first point and the emitter of said transistor.

a series circuit comprising a first coil connected at one end to said first point and a third capacitor connected between the other end of this first coil and the emitter of said transistor.

a modulating signal source having power source terminals and a signal output terminal and putting out of this signal output terminal a pulse signal varying in the vertical period;

a means of feeding said pulse signal from said modulating signal source to said second resonant capacitor through a second coil; and a power source feeding means feeding the DC voltage produced in said third capacitor to the power source terminal of said modulating signal source.

In the second invention, a power source voltage for driving the modulating signal source can be obtained from the voltage produced in the third capacitor of the series circuit connected in parallel with this second resonant capacitor.

DETAILED DESCRIPTION OF THE PREFERRED EMBODIMENTS

The embodiments shall be explained with reference to the drawings.

Figure 1:
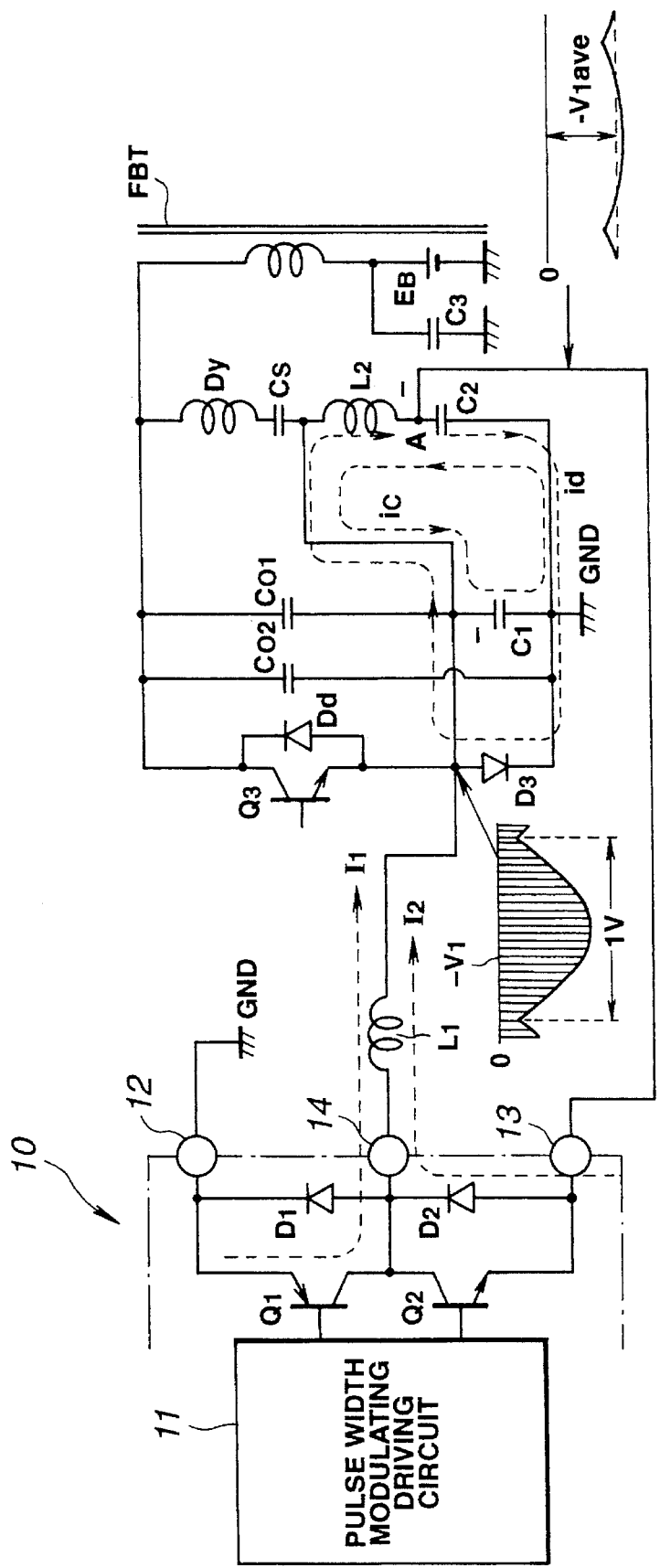
FIG. 1 is a circuit diagram showing a horizontal output circuit embodying the present invention.

FIG. 1 shows a horizontal output circuit embodying the present invention.

Figure 6:
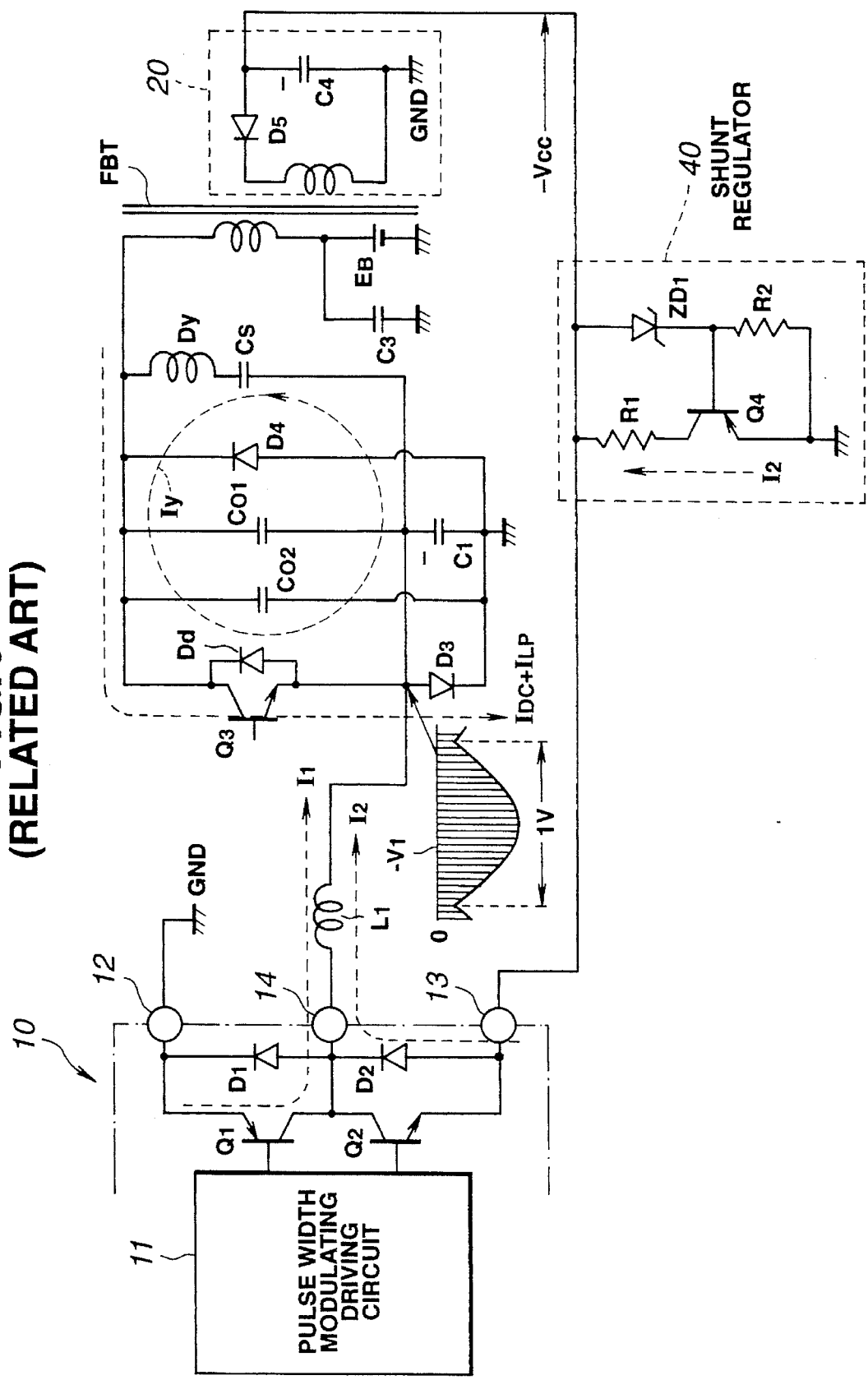
FIG. 6 is a diagram showing a conventional horizontal output circuit.

The same components as in FIG. 6 shall bear the same reference numerals in the explanation.

A horizontal output transistor Q3 has a base, emitter and collector and fed on the base with a driving signal of a horizontal period (1H). A damper diode Dd, first resonant capacitor C01 and series circuit of a horizontal deflecting coil Dy and S correcting capacitor Cs are connected in parallel between the collector and emitter of the horizontal output transistor Q3. A second resonant capacitor C02 is connected between the collector of the horizontal output transistor Q3 and a reference potential point GND. A diode D3 of a polarity reverse to that of said damper diode Dd and a capacitor C1 are connected in parallel between the emitter of the horizontal output transistor Q3 and the reference potential point GND. A smooth circuit comprising a coil L2 and capacitor C2 is connected in parallel between the emitter of the horizontal output transistor Q3 and reference potential point GND.

The collector of the horizontal output transistor Q3 is connected to a DC power source EB through the primary winding of a fly-back transformer FBT. A decoupling capacitor C3 is connected in parallel to the DC power source EB.

A pulse width modulating IC 10 is connected through a coil L1 to the capacitor C1 at one end. Power source terminals 12 and 13 and a signal output terminal 14 are provided in this pulse width modulating IC 10. Signal output terminal 14 and said capacitor C1 are connected at one end with each other through the coil L1.

A pulse signal varying in the vertical period is output from the signal output terminal 14 of the pulse width modulating IC 10. The pulse signal from the pulse width modulating IC 10 is fed to the capacitor C1 through the coil L1. A DC voltage produced in the capacitor C2 is fed to the negative power source terminal 13 of the pulse width modulating IC 10.

The above mentioned pulse width modulating IC 10 is provided with the pulse width modulating driving circuit 11 generating a pulse row varying in the vertical period. The pulse row from the pulse width modulating driving circuit 11 is fed to the base of the PNP transistor Q1 or the NPN transistor Q2. The emitter of the Q1 is connected to the positive power source terminal 12, and the collector the Q1 is connected to the collector of the NPN transistor Q2. The emitter of the NPN transistor is connected to the negative power source terminal 13. The pulse row from the above mentioned pulse width modulating driving circuit 11 is fed to the base of the Q2. The commonly connected collectors of the PNP transistor Q1 and NPN transistor Q2 are connected to said signal output terminal 14. A diode D1 is connected in parallel between the emitter and collector of the PNP transistor Q1. The cathode of the diode D1 is connected to the emitter of the PNP transistor Q1 and the anode is connected to said signal output terminal 14. A diode D2 is connected in parallel between the collector and emitter of the NPN transistor Q2. The cathode of the diode D2 is connected to said signal output terminal 14 and the anode is connected to the emitter of said NPN transistor Q2.

The circuit in FIG. 1 does not include the diode D4 between the collector of the horizontal output transistor Q3 and the reference potential point GND, negative power source rectifying circuit 20 and shunt regulator 40 in FIG. 6. But the circuit of FIG. 1 includes a smooth circuit of a coil L2 and capacitor C2 which are not included in FIG. 6. Otherwise, the formation is the same as in the circuit in FIG. 6.

The smooth circuit of the coil L2 and capacitor C2 are provided in parallel with the capacitor C1 in FIG. 1 to integrate the voltage generated in the capacitor C1. A negative power source voltage is fed to the power source terminal 13 from the connecting point A of the coil L2 and capacitor C2.

The negative resonant voltage −V1 produced in the capacitor C1 is varied to be parabolic in the vertical period (1V) by the pulse modulating IC 10 and the east and west pincushion distortion is corrected the same as heretofore.

FIGS. 2(a)–2(e) explain the operation in FIG. 1. FIG. 2 shows the operation over the horizontal period (1H). The time is shown on the abscissa of the diagram.

The operation in FIG. 1 shall be explained using FIGS. 2(a)–2(e).

In FIG. 2(a) shows a negative resonant voltage −V1 produced in the capacitor C1, FIG. 2(b) shows an average value −Vlave of the negative resonant voltage, FIG. 2(c) shows a voltage waveform put out of the signal output terminal 14 of the modulating IC 10, FIG. 2(d) shows a current waveform put out of the signal output terminal 14 of the modulating IC 10 and FIG. 2(e) shows a discharge current of the capacitor C2.

During the period from t0 to t2, a driving voltage is fed to the base of the PNP transistor Q1 from the driving circuit 11 in the front step. The PNP transistor Q1 becomes conductive and an output current I1 flows to the coil L1 from the signal output terminal 14 through the emitter and collector path from the reference potential point GND. From t0 to t1 (fly-back period) within this period, the current I1 linearly increases due to the negative resonant voltage −V1 (see FIG. 2(a)) produced in the capacitor C1. From t1 to t2, both ends of the capacitor C1 are short-circuited by the diode D3 so that both are of the reference potential. There is no voltage within the loop of the positive power source terminal 12 of the reference potential point and the signal output terminal 14, and the electric current I1 is maintained at the current at time t1. At t2, the Q1 is off (at this time, a driving voltage is applied to the base of the NPN transistor Q2 from the driving circuit 11 of the front step and the Q2 becomes on). Due to a counter electromotive force generated in the coil L1, the electric current I2 flows to the coil L1 through the diode D2 from the negative power source terminal 13 in the direction keeping the previous current. At this time, the current I2 flows to the coil L1 through the diode D2 from the negative power source stored in the capacitor C2. By the way, a negative power source −Vlave obtained by integrating a negative resonant voltage −V1 generated in the fly-back period in the capacitor C1 is produced in advance in the capacitor C2 (see FIG. 2(b)).

This negative power source is equal in the magnitude to the average value −Vlave of the resonant voltage −V1 and is charged with a current ic flowing toward capacitor C2 from the capacitor C1 during the fly-back period. As the linear current flow is reversed due to this negative power source −Vlave, the current I2 reduces with the time. Again, at t0, a driving voltage is applied to the base of the transistor and the above mentioned operation is repeated. If the period from t0 through t1 to t2 is made T1 and the time interval from t2 to t0 is made T2, the magnitude of the resonant voltage (−V1) produced in the capacitor C1 can be modulated by varying the time ratio of T1 to T2.

Figure 2:
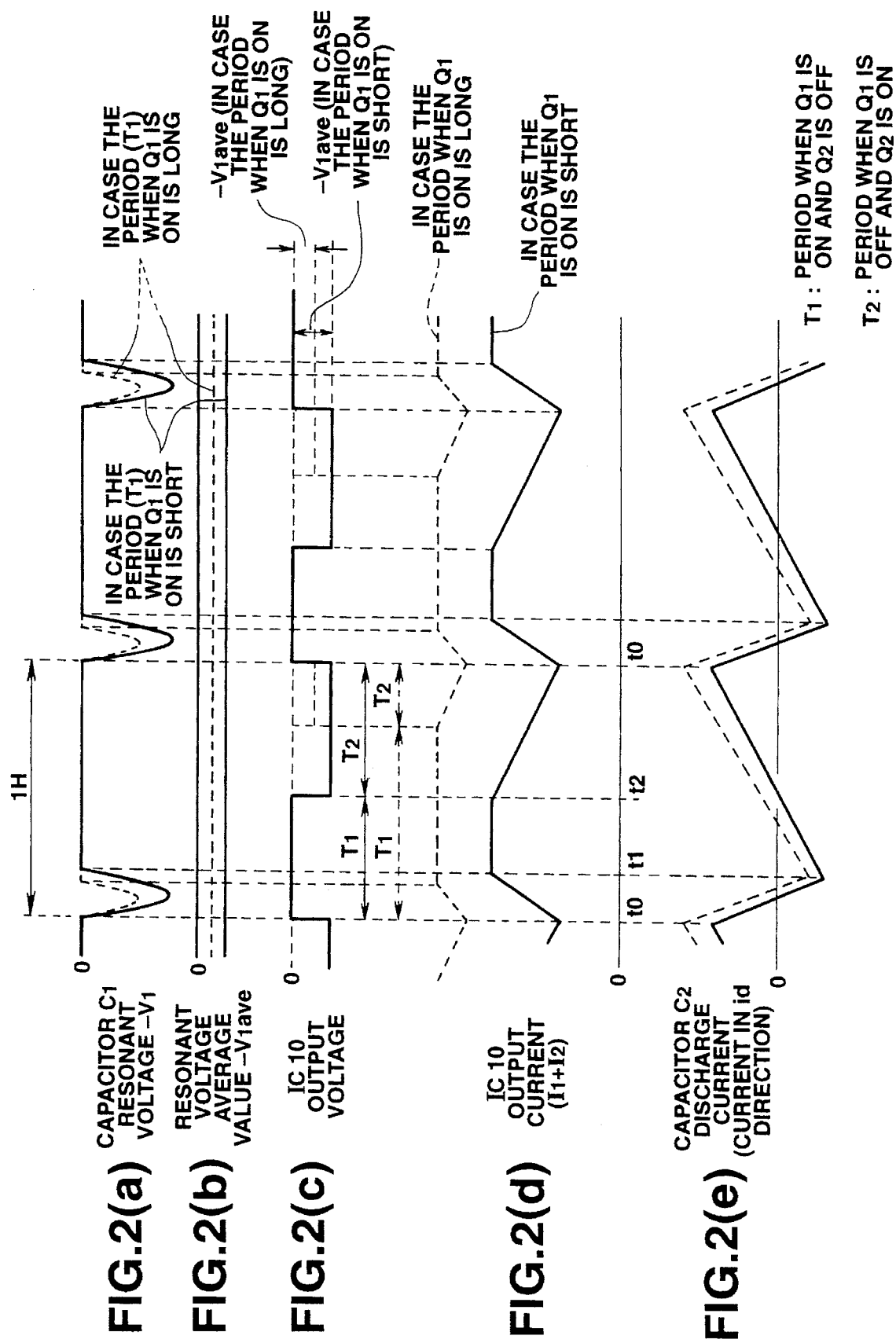
FIGS. 2(a)–2(e) are voltage and current waveform diagrams for explaining the operation in FIG. 1.
Figure 7:
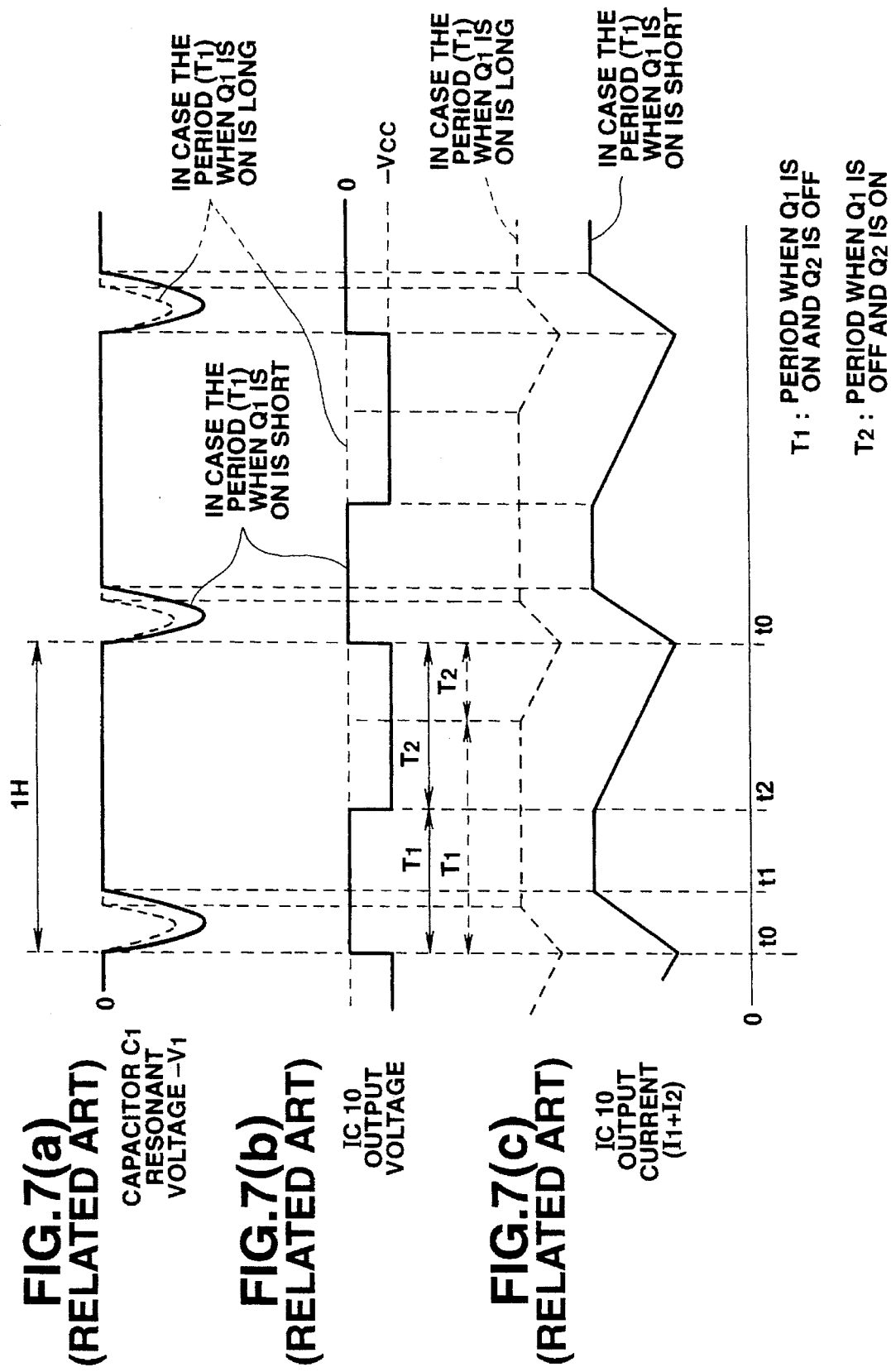
FIGS. 7(a)–7(c) are voltage and current waveform diagrams for explaining the operation in FIG. 6.

The dotted line waveform in FIG. 2 shows the time ratio, representing the operation when the time ratio is varied against the solid line waveform, where T1 is made longer and T2 is made shorter. When T1 is made longer, the discharge current of the capacitor C1 flowing through the coil L1 will increase so that the resonant voltage (of a negative value −V1) produced in the capacitor C1 will become smaller. If the ratio of T1/T2 is varied in the vertical period by utilizing this principle, the east and west pincushion distortion will be able to be corrected. That is to say, if the (T1/T2) is made larger at the beginning and end of the vertical period and is made smaller in the place corresponding to the middle of the picture, the resonant voltage (−V1) will become smaller at the beginning and end of the vertical period and will become larger in the place corresponding to the middle of the picture. Therefore, similar to FIG. 7, as evident from the formula 1, the deflecting current Iy becomes smaller at the beginning and end of the vertical period and becomes larger in the place corresponding to the middle of the picture so that the east and west pincushion distortion can be corrected.

Figure 3:
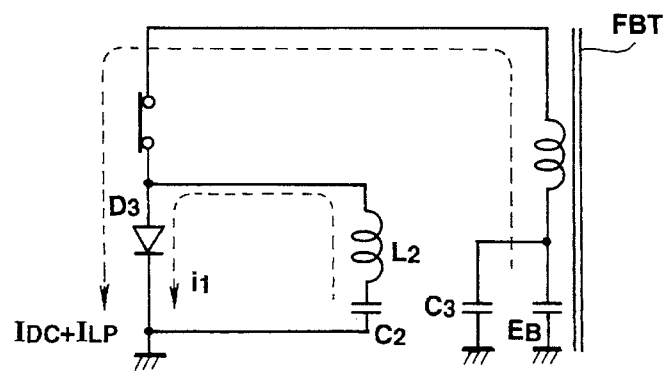
FIG. 3 is a circuit diagram for explaining the operation in the front half of the scanning period of the series circuit of the coil and capacitor in FIG. 1.
Figure 4A:
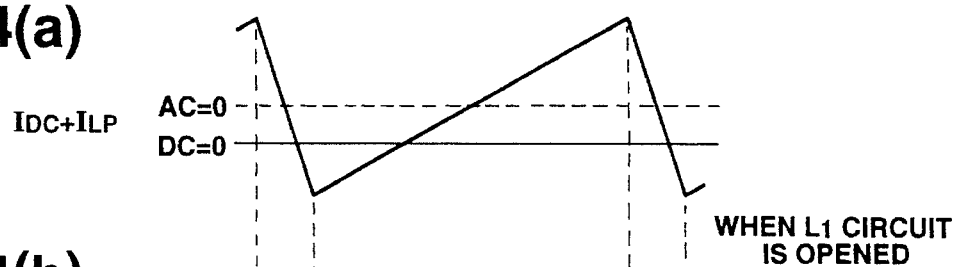
FIGS. 4(a)–4(c) are diagrams showing various current waveforms flowing through the circuit in FIG. 3.
Figure 4B:
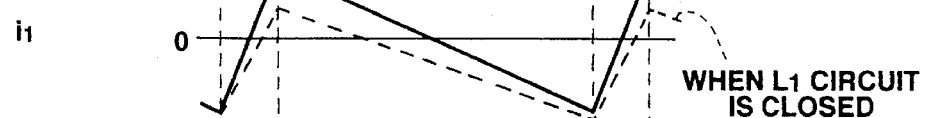
Figure 4C:
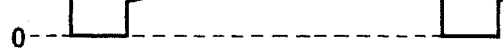

In the circuit of the present invention, the coil L2 and capacitor C2 for integrating the resonant voltage (−V1) are newly added to the circuit in FIG. 6. Therefore and there is no diode D4 in FIG. 6, even if the sum of the primary winding current ILP of the fly-back transformer FBT and the direct current IDC flowing in from the DC power source EB is negative at the beginning of the scanning period, the diode D3 will not be off and the current will not be discontinuous. This is shown in FIG. 3 and FIG. 4(a)–4(c). FIG. 4(a) represents (IDC+ILP), FIG. 4(b) represents a current i1 shown in FIG. 3, and FIG. 4(c) represents a current (IDC+ILP+i1) which flows through the diode D3. By the way, IDC is a direct current flowing from the DC power source EB into the horizontal output circuit. ILP is a current flowing through a primary coil of the fly-back transformer FBT. I1 is a current flowing through the coil L2. I1 is equal to ic–id in FIG. 1 and flows through the capacitor C1 in the fly-back period and through the diode D3 in the scanning period. As the coil L2 and capacitor C2 are newly added, the current i1 will flow in the direction shown in FIG. 3, and, as shown in FIG. 4(c), the current (ILP+IDC+i1) flowing through the diode D3 will not become negative at the beginning of the scanning period.

Now, in the circuit of the present invention, the current in the T2 period passes from the reference potential point GND through the capacitor C2 to the diode D2 and coil L1. At this time, the capacitor C2 is charged to be of a negative polarity. But, in the scanning period when diode D3 is conductive, the charge giving rise to a negative polarity is discharged as a current id and therefore the voltage at both ends of the capacitor C2 is kept at a constant voltage −Vlave. Therefore, the shunt regulator conventionally required for the circuit becomes unnecessary, the cost and number of parts may be small and the wasted electric power can be omitted. The negative power source produced in the capacitor C2 is made by integrating the resonant voltage −V1 generated in the capacitor C1. Its magnitude is equal to the average value −Vlave of the resonant voltage. Therefore, when the resonant voltage −V1 is made larger to make the correction amount larger, the negative voltage −Vlave produced in the capacitor C2 will also automatically become larger. Therefore, the manipulation of making the negative power source −Vcc larger by winding up the tertiary winding of the fly-back transformer FBT as in the conventional circuit (FIG. 6) becomes unnecessary and the fly-back transformer FBT can be standardized.

Using this invention, a power source can be fed to the power source terminal 13 of the pulse width modulating IC from the capacitor C2 without providing a stabilizing power source circuit.

Figure 5:
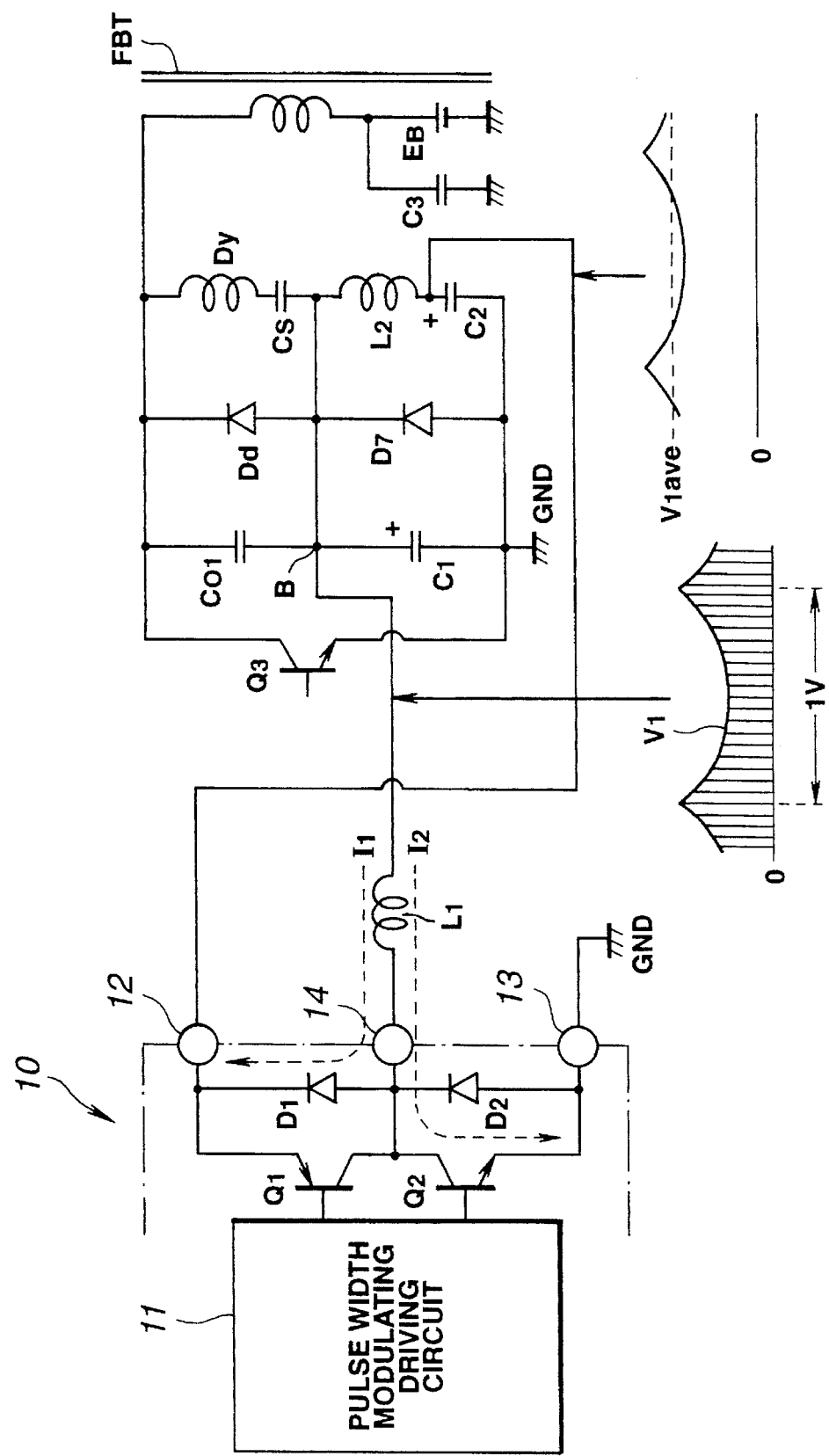
FIG. 5 is a circuit diagram showing another horizontal output circuit embodying the present invention.
Figure 8:
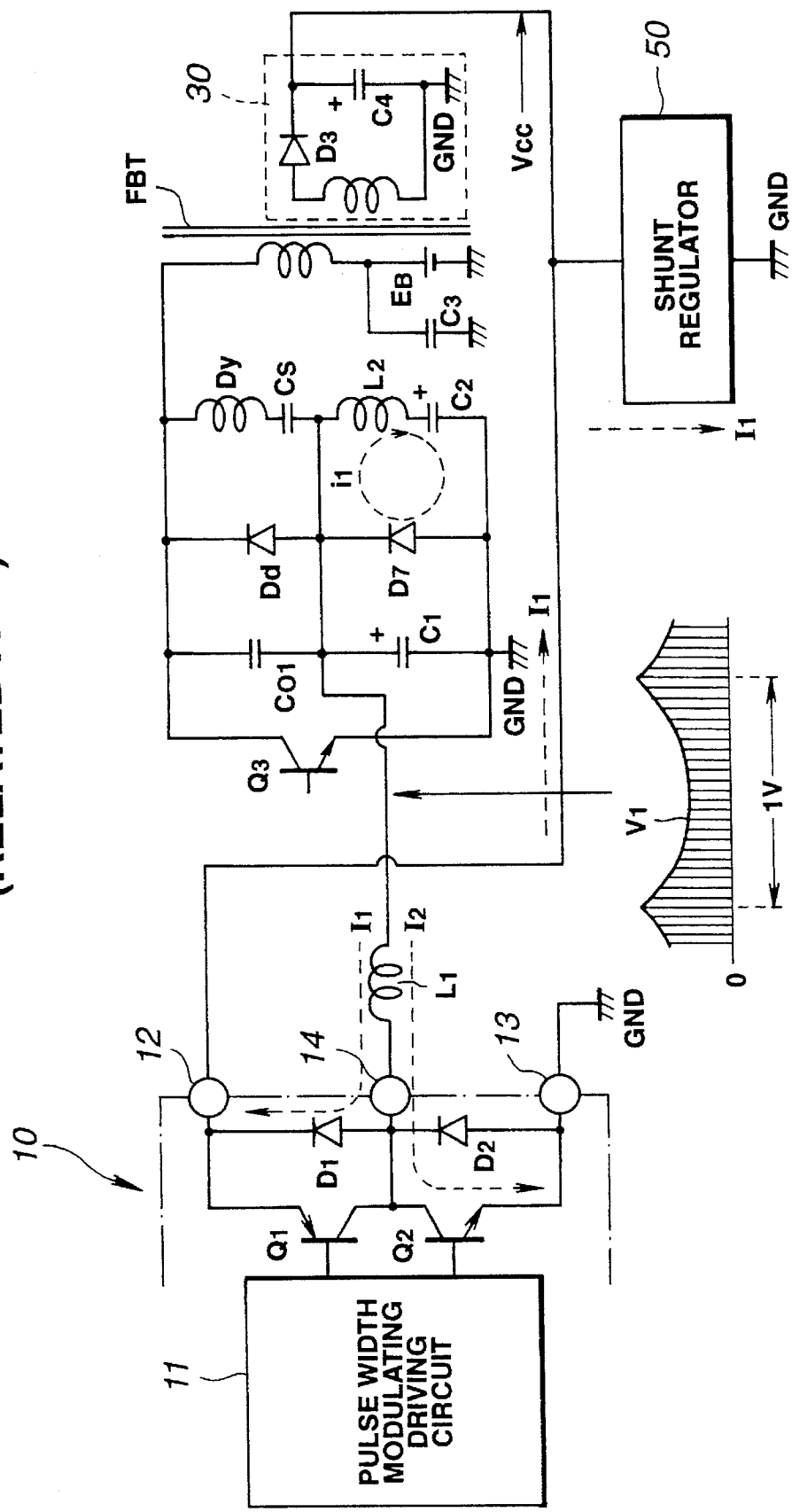
FIG. 8 is a circuit diagram showing another conventional horizontal output circuit.

FIG. 5 is of another embodiment of the present invention. It provides an example where the circuit of the present invention is applied to the circuit in FIG. 8.

A driving signal of a horizontal period (1H) is fed to the base of a horizontal output transistor Q3. A first damper diode Dd, first resonant capacitor C01 and series circuit of a horizontal deflecting coil Dy and S correcting capacitor Cs are connected in parallel between the collector of the horizontal output transistor Q3 and a B point. A second damper diode D7 and second resonant capacitor C1 are connected in parallel between the B point and the emitter of the horizontal output transistor Q3. A series circuit of a coil L2 and capacitor C2 is connected in parallel between said B point and the emitter of horizontal output transistor Q3.

The collector of the horizontal output transistor Q3 is connected to a DC power source EB through the primary winding of a fly-back transformer FBT. A decoupling capacitor C3 is connected in parallel to the DC power source EB.

A pulse width modulating IC 10 is connected to the second resonant capacitor C1 at one end through a coil L1. This pulse width modulating IC 10 is provided with power source terminals 12 and 13 and a signal output terminal 14. This signal output terminal 14 and capacitor C1 are connected at one end with each other through the coil L1.

A pulse signal varying in the vertical period is output from the signal output terminal 14 of the pulse width modulating IC 10. The pulse signal from the pulse width modulating IC 10 is fed to the second resonant capacitor C1 through the coil L2. The DC voltage produced in the capacitor C2 is fed to the positive power source terminal 12 of a pulse width modulating IC 10.

The above-mentioned pulse width modulating IC 10 is provided with the pulse width modulating driving circuit 11 generating a pulse row varying in the vertical period. The pulse row from the pulse width modulating driving circuit 11 is fed to the base of the PNP transistor Q1. The emitter of transistor Q1 is connected to the positive power source terminal 12. The collector of transistor Q1 is connected to the collector of the NPN transistor Q2. The NPN transistor Q2 has its emitter connected to the negative power source terminal 13 and has the pulse row from said pulse width modulating driving circuit 11 fed to the base. The collector to which the PNP transistor Q1 and NPN transistor Q2 are commonly connected is connected to signal output terminal 14. The diode D1 is connected in parallel between the emitter and collector of the PNP transistor Q1. The cathode of the diode D1 is connected to the emitter of the PNP transistor Q1 and the anode is connected to said signal output terminal 14. The diode D2 is connected in parallel between the collector and emitter of the NPN transistor Q2. The cathode of the diode D2 is connected to said signal output terminal 14 and the anode is connected to the emitter of said NPN transistor Q2.

In such formation, by feeding the positive power source terminal 12 of the pulse width modulating IC 10 with the voltage Vlave (produced in the capacitor C2) obtained when the resonant voltage V1 produced in the capacitor C1 of the pincushion distortion correcting circuit is integrated in the series circuit of the coil L2 and capacitor C2, the same effect as in FIG. 1 can be obtained.

As described above, according to the present invention, by only adding some component parts to the east and west pincushion distortion correcting circuit, a positive or negative power source is obtained and the power consumption of the entire circuit is reduced without providing the fly-back transformer with the tertiary winding. There is also an effect that, without varying the number of windings of the fly-back transformer, the power source can be fed in response to the correction amount.

The present invention is not limited only to the above described embodiments and various modifications can be made in a range not deviating from the subject matter of the invention.

What is claimed is:

1. A horizontal output circuit comprising:

a horizontal output transistor having a base, an emitter and a collector, said base receiving a driving signal of a horizontal period;

a first parallel circuit including a damper diode, a first resonant capacitor and a series circuit connected in parallel between said collector and said emitter of said horizontal output transistor, said series circuit including a horizontal deflecting coil and a S correcting capacitor;

a second resonant capacitor connected between said collector of said horizontal output transistor and a reference potential point;

a second parallel circuit including a diode and a third capacitor arranged in parallel between said emitter of said horizontal output transistor and reference potential point, a polarity of said diode being reverse of a polarity of said damper diode;

a smooth circuit comprising a first coil connected at a first end to said emitter of said horizontal output transistor and a fourth capacitor connected between a second end of said first coil and said reference potential point;

a modulating signal source having at least one power source terminal and a signal output terminal, a pulse signal varying in vertical period being output from said signal output terminal;

means for supplying said pulse signal from said modulating signal source to said third capacitor through a second coil; and power source feeding means for supplying the voltage produced in said fourth capacitor to said power source terminal of said modulating signal source.

2. A horizontal output circuit according to claim 1, wherein said modulating signal source comprises:

a pulse generating circuit generating a pulse row varying in a pulse width in a vertical period;

a PNP transistor having an emitter connected to a positive power source terminal, a base receiving said pulse row from said pulse generating circuit and a collector;

an NPN transistor having an emitter connected to a negative power source terminal, a base receiving said pulse row from said pulse generating circuit, and a collector connected to said collector of said PNP transistor;

a signal output terminal connected to said collectors of said PNP transistor and said NPN transistor;

a first diode having a cathode connected to said emitter of said PNP transistor and having an anode connected to said signal output terminal; and a second diode having an anode connected to said emitter of said NPN transistor and having a cathode connected to said signal output terminal, said voltage produced in said fourth capacitor being supplied to said negative power source terminal.

3. A horizontal output circuit comprising:

a horizontal output transistor having a base, an emitter and a collector, said base receiving a driving signal of a horizonal period;

a first parallel circuit including a first damper diode, a first resonant capacitor and a first series circuit connected in parallel between said collector of said horizontal output transistor and a first point, said first series circuit including a horizontal deflecting coil and an S corrector capacitor;

a second parallel circuit including a second damper diode and a second resonant capacitor connected in parallel between said first point and said emitter of said horizontal output transistor;

a second series circuit comprising a first coil connected at a first end to said first point and a third capacitor connected between a second end of said first coil and said emitter of said horizontal output transistor;

a modulating signal source having at least one power source terminal and a signal output terminal, a pulse signal varying in vertical period being output from said signal output terminal;

means for supplying said pulse signal from said modulating signal source to said second resonant capacitor through a second coil; and a power source supplying said voltage produced in said third capacitor to said power source terminal of said modulating signal source.

4. A horizontal output circuit according to claim 3, wherein said modulating signal source comprises:

a pulse generating circuit generating a pulse row varying in a pulse width in vertical period;

a PNP transistor having an emitter connected to a positive power source terminal, a base receiving said pulse row from said pulse generating circuit and a collector;

an NPN transistor having an emitter connected to a negative power source terminal, a base receiving said pulse row from said pulse generating circuit, and a collector connected to a collector of said PNP transistor;

a signal output terminal connected to said collectors of said PNP transistor and said NPN transistor;

a first diode having a cathode connected to said emitter of said PNP transistor and having an anode connected to said signal output terminal; and a second diode having an anode connected to said emitter of said NPN transistor and having a cathode connected to said signal output terminal, said voltage produced in said third capacitor being supplied to said positive power source terminal.

5. The horizontal output circuit of claim 3, wherein said emitter of said horizontal output circuit is connected to a reference potential point.

6. The horizontal output circuit of claim 4, wherein said emitter of said horizontal output circuit is connected to a reference potential point.

* * * * *